US012362462B2

(12) United States Patent
Wang et al.

(10) Patent No.: US 12,362,462 B2
(45) Date of Patent: Jul. 15, 2025

(54) BASE STATION ANTENNAS HAVING PARASITIC ELEMENTS ON MULTIPLE FACES OF A REFLECTOR

(71) Applicant: Outdoor Wireless Networks LLC, Claremont, NC (US)

(72) Inventors: Lin Wang, Tokyo (JP); Jianpeng Lu, Suzhou (CN); Haiyan Chen, Suzhou (CN); Hangsheng Wen, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 121 days.

(21) Appl. No.: 18/343,101

(22) Filed: Jun. 28, 2023

(65) Prior Publication Data

US 2024/0145903 A1 May 2, 2024

Related U.S. Application Data

(60) Provisional application No. 63/381,601, filed on Oct. 31, 2022.

(51) Int. Cl.
*H01Q 21/20* (2006.01)
*H01Q 1/24* (2006.01)
*H01Q 15/18* (2006.01)

(52) U.S. Cl.
CPC ............. *H01Q 1/246* (2013.01); *H01Q 15/18* (2013.01); *H01Q 21/205* (2013.01)

(58) Field of Classification Search
CPC .......... H01Q 1/246; H01Q 5/42; H01Q 15/18; H01Q 19/108; H01Q 21/205; H01Q 21/26
See application file for complete search history.

(56) References Cited

U.S. PATENT DOCUMENTS 10,601,120 B2 3/2020 Bisiules et al.
2018/0331419 A1* 11/2018 Varnoosfaderani .... H01Q 13/10
2023/0170615 A1 6/2023 Hamdy et al.

FOREIGN PATENT DOCUMENTS

CN 202695707 U * 1/2013 ............... H01Q 1/36
CN 214477906 U * 10/2021 ............... H01Q 1/38
CN 114122684 A * 3/2022 ............... H01Q 1/36
WO 2017165512 A1 9/2017
WO 2020205225 A1 10/2020
WO WO-2022164761 A1 * 8/2022 ............. H01Q 1/246

* cited by examiner

*Primary Examiner* — Hoang V Nguyen
(74) *Attorney, Agent, or Firm* — Myers Bigel, P.A.

(57) ABSTRACT

Base station antennas are provided. A base station antenna includes a reflector that has a plurality of faces that face in different directions. The base station antenna includes a plurality of arrays of radiating elements that are on the faces, respectively, of the reflector. Moreover, the base station antenna includes a plurality of parasitic elements that are on the faces. Related methods of operating a base station antenna are also provided.

20 Claims, 12 Drawing Sheets

BASE STATION ANTENNAS HAVING PARASITIC ELEMENTS ON MULTIPLE FACES OF A REFLECTOR

CROSS-REFERENCE TO PRIORITY APPLICATION

The present application claims priority under 35 U.S.C. § 119 to U.S. Provisional Application No. 63/381,601, filed Oct. 31, 2022, the disclosure of which is incorporated herein by reference in its entirety.

FIELD

The present disclosure relates to radio communications and, more particularly, to base station antennas used in cellular and other communications systems.

BACKGROUND

Cellular communications systems are well known in the art. In a cellular communications system, a geographic area is divided into a series of regions or "cells" that are served by respective base stations. Each base station may include one or more base station antennas that are configured to provide two-way RF communications with subscribers that are within the cell served by the base station. In many cases, each base station is divided into "sectors." In one common configuration, a hexagonally-shaped cell is divided into three 120° sectors in the azimuth plane, and each sector is served by one or more base station antennas that generate outwardly-directed radiation patterns. For example, a base station antenna may generate an omnidirectional antenna pattern in the azimuth plane, meaning that the base station antenna may provide coverage extending through a full 360° circle in the azimuth plane.

Example base station antennas are discussed in International Publication No. WO 2017/165512 to Bisiules, U.S. patent application Ser. No. 15/921,694 to Bisiules et al., and U.S. Patent Application No. 63/024,846 to Hamdy et al., the disclosures of which are hereby incorporated herein by reference in their entireties. Base station antennas typically include one or more linear arrays or two-dimensional arrays of radiating elements, such as dipole, or crossed-dipole, radiating elements that act as individual antenna elements. An RF feed network may be used to pass RF signals between the arrays and one or more radios.

SUMMARY

Pursuant to some embodiments of the present invention, base station antennas are provided that include a reflector that has a plurality of faces that face in different directions. The base station antenna may include a plurality of arrays of radiating elements that are on the faces, respectively, of the reflector. The base station antenna may include a plurality of parasitic elements that are on the faces between the arrays. Moreover, the faces may be at least three faces.

In some embodiments, a total number of the parasitic elements may be equal to or greater than a total number of the radiating elements. For example, the total number of the parasitic elements may be at least double the total number of the radiating elements. As another example, the total number of the parasitic elements may be at least quadruple the total number of the radiating elements.

According to some embodiments, the parasitic elements may include respective metal rods. Longitudinal axes of the metal rods may project outward from the faces. The metal rods may be cylindrical or rectangular. Moreover, each of the metal rods may have a length of 18-20 millimeters.

In some embodiments, the parasitic elements may include respective metal sheets. In other embodiments, the parasitic elements may include respective metal layers on respective printed circuit boards that are spaced apart from the radiating elements.

According to some embodiments, a first of the parasitic elements may be on a printed circuit board of a first of the radiating elements.

In some embodiments, the base station antenna may include a plurality of insulating supports that are between the parasitic elements, respectively, and the reflector.

According to some embodiments, the arrays may include consecutive first through sixth arrays on consecutive first through sixth of the faces, respectively. The first, third, and fifth arrays may be configured to collectively generate first and third antenna beams. The second, fourth, and sixth arrays may be configured to collectively generate second and fourth antenna beams.

In some embodiments, the parasitic elements may be configured to radiate at a high-frequency portion of a frequency band of the radiating elements, and to not radiate at a low-frequency portion of the frequency band.

According to some embodiments, the parasitic elements may be configured to increase a roundness of an azimuth radiation pattern of the radiating elements more at a high-frequency portion of a frequency band of the radiating elements than at a low-frequency portion of the frequency band.

In some embodiments, at least two of the parasitic elements may be between a first of the radiating elements that is on a first of the faces and a second of the radiating elements that is on a second of the faces. The first of the faces may be adjacent the second of the faces. Moreover, no radiating element may be between the first and the second of the radiating elements.

A base station antenna, according to some embodiments, may include a reflector that has a plurality of faces that face in different directions. The base station antenna may include a plurality of arrays of radiating elements that are on the faces, respectively, of the reflector. The base station antenna may include a plurality of metal rods that are on the faces. Each of the metal rods may have a length of 18-20 millimeters.

In some embodiments, a total number of the metal rods may be at least double a total number of the radiating elements. The metal rods may project outward from the faces. Moreover, the base station antenna may include a plurality of insulating supports that are between the metal rods, respectively, and the reflector.

A base station antenna, according to some embodiments, may include a reflector that has a plurality of faces that face in different directions. The base station antenna may include a plurality of arrays of radiating elements that are on the faces, respectively, of the reflector. The base station antenna may include a plurality of parasitic elements that are on the faces. Moreover, the parasitic elements may be configured to increase a roundness of an azimuth radiation pattern of the radiating elements more at a high-frequency portion of a frequency band of the radiating elements than at a low-frequency portion of the frequency band.

In some embodiments, the faces may be six faces. The parasitic elements may be configured to radiate at the high-frequency portion of the frequency band, and to not radiate at the low-frequency portion of the frequency band.

A method of operating an omnidirectional base station antenna, according to some embodiments, may include providing a first antenna beam via a plurality of first arrays of radiating elements that are on a plurality of non-consecutive first faces, respectively, of a reflector of the omnidirectional base station antenna. Moreover, the method may include providing a second antenna beam via a plurality of second arrays of radiating elements that are on a plurality of non-consecutive second faces, respectively, of the reflector. The omnidirectional base station antenna may include a plurality of parasitic elements that are on the reflector between the first arrays and the second arrays. The parasitic elements may increase a roundness of an azimuth radiation pattern of the first arrays and the second arrays more at a high-frequency portion of a frequency band of the first arrays and the second arrays than at a low-frequency portion of the frequency band.

In some embodiments, the method may include providing a third antenna beam via the first arrays and not via the second arrays. Moreover, the method may include providing a fourth antenna beam via the second arrays and not via the first arrays. The first and second antenna beams may be first-polarization antenna beams. The third and fourth antenna beams may be second-polarization antenna beams.

According to some embodiments, the first faces may be three faces. The second faces may be three faces that alternate along the reflector with the three faces of the first faces.

In some embodiments, the parasitic elements may include respective metal rods.

DETAILED DESCRIPTION

Pursuant to embodiments of the present invention, base station antennas (e.g., wideband omnidirectional small-cell antennas) are provided that overcome or mitigate various difficulties with conventional omnidirectional base station antennas. For example, an azimuth radiation pattern of a conventional wideband omnidirectional antenna may suffer from reduced/inconsistent roundness (i.e., the peak gain of the antenna exhibits excessive variation as a function of azimuth angle), particularly in some higher frequency points in a frequency band of the antenna. As a result, a coverage range of such an antenna may be relatively poor (e.g., may be frequency-dependent and/or may vary in different directions, due to too much variation in azimuth roundness at high frequencies).

An antenna according to embodiments of the present invention, however, may improve (i.e., increase) the roundness of an azimuth radiation pattern generated by the antenna at higher-frequency points of a frequency band without affecting the roundness at lower-frequency points of the frequency band. This increased roundness may be accomplished by including parasitic elements (e.g., metal rods) between arrays of radiating elements of the antenna, as the parasitic elements can broaden an azimuth beamwidth of an antenna beam at higher frequencies. For example, the parasitic elements may project outwardly from a reflector of the antenna in parallel with radiating elements of the arrays. In some embodiments, performance of the parasitic elements may be impacted by lengths of the parasitic elements and/or by distances between the parasitic elements and adjacent radiating elements. As an example, azimuth roundness may increase at high frequencies when a parasitic element is farther from the radiating elements and/or has a length that is about a quarter-wavelength of a high-frequency portion of an operating frequency band of the radiating elements.

Radiating elements that are described herein may be, for example, dual-polarized radiating elements. Each dual-polarized radiating element includes a first polarization radiator and a second polarization radiator. The most commonly used dual-polarized radiating elements are crossed-dipole radiating elements that include a slant −45° dipole radiator and a slant +45° dipole radiator. Example dual-polarization dipole radiating elements are discussed in International Patent Application No. PCT/US2020/023106, the disclosure of which is hereby incorporated herein by reference in its entirety. It will be appreciated, however, that any appropriate radiating elements may be used, including, for example, single polarization dipole radiating elements or single or dual polarization patch radiating elements, in other embodiments.

Example embodiments of the present invention will be described in greater detail with reference to the attached figures.

Figure 1A:
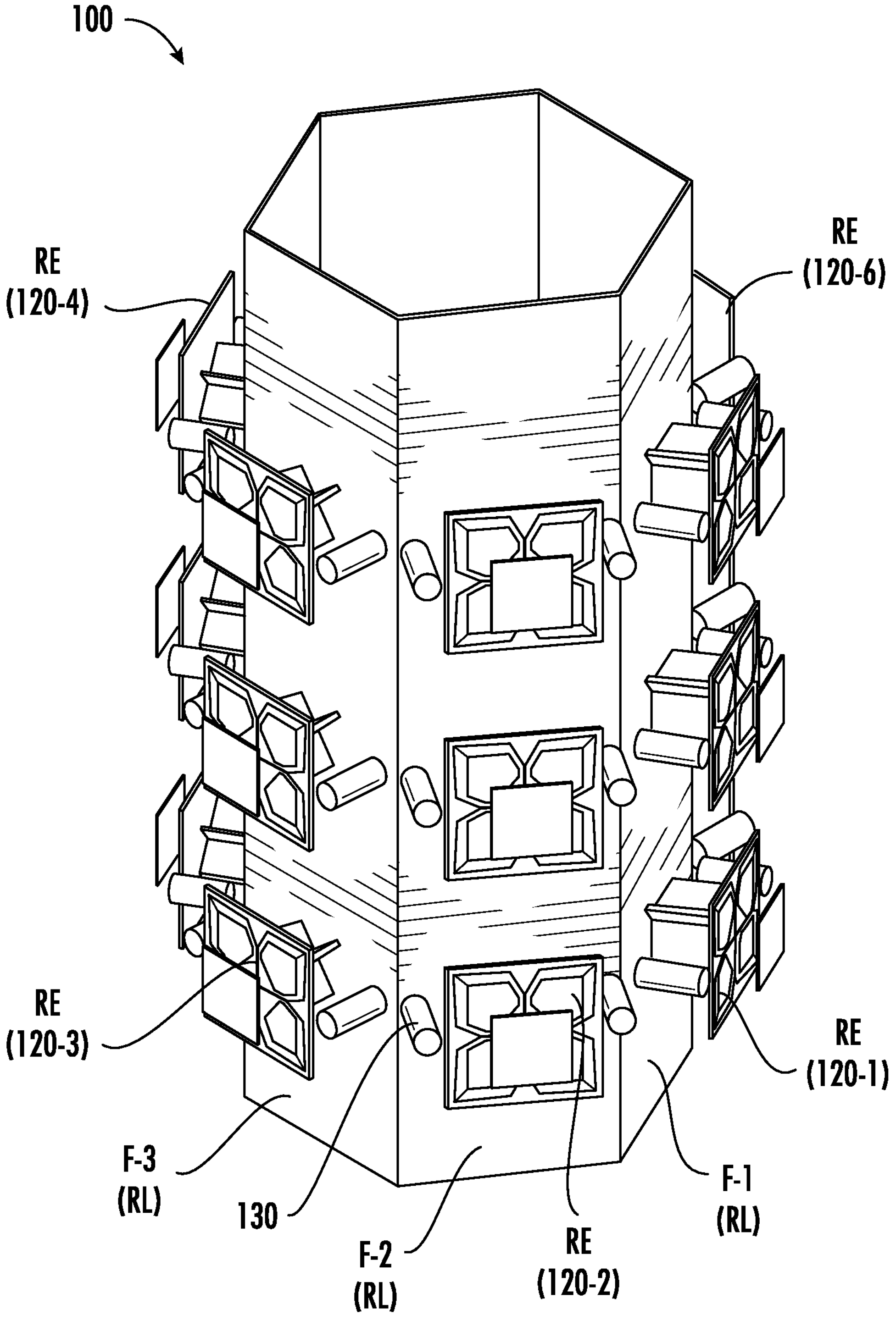
FIG. 1A is a side perspective view of a base station antenna, according to embodiments of the present invention.
Figure 1B:
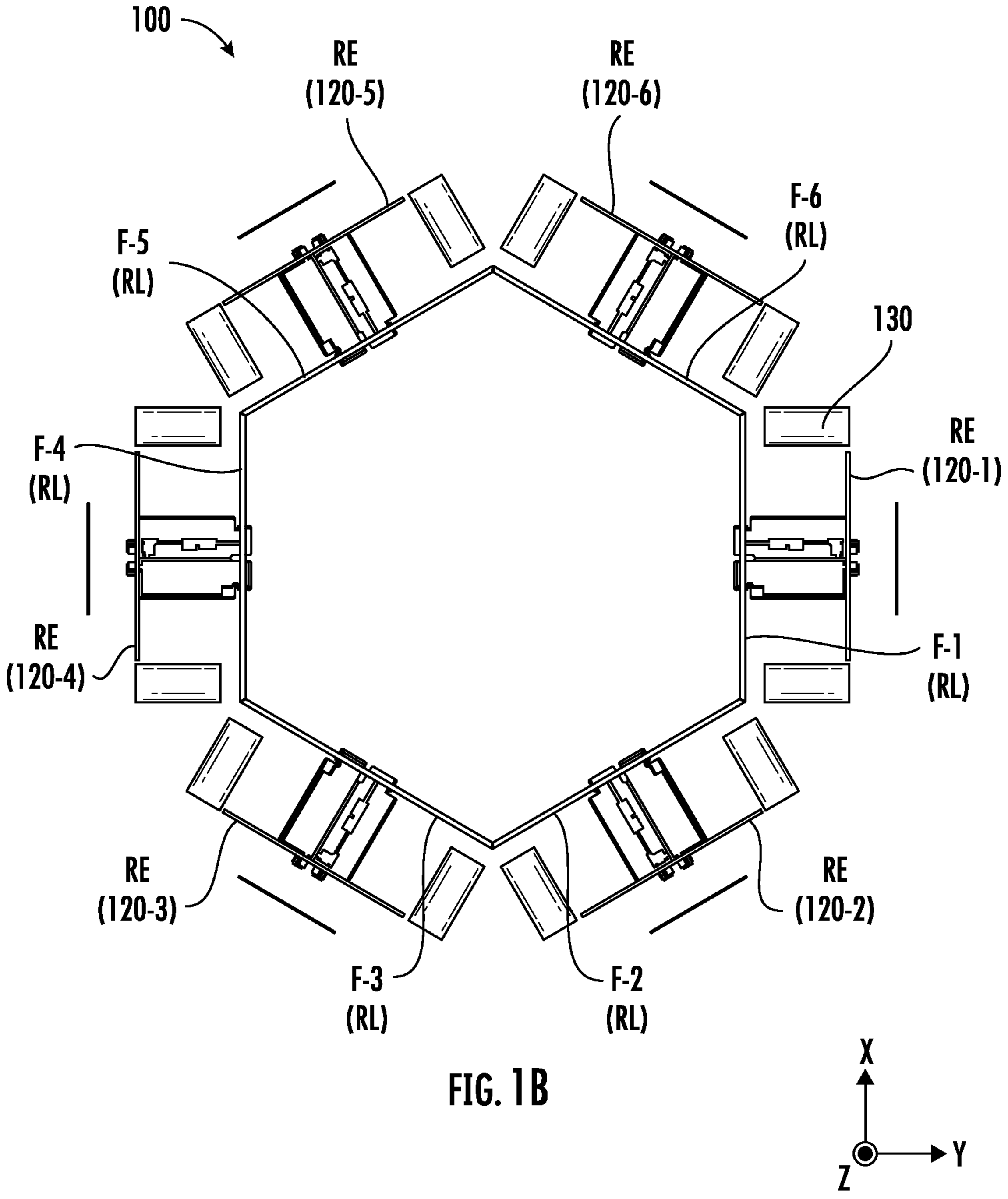
FIG. 1B is a top view of the base station antenna of FIG. 1A.

FIG. 1A is a side perspective view of an omnidirectional/multi-sector base station antenna 100, according to embodiments of the present invention, and FIG. 1B is a top view of the antenna 100 of FIG. 1A. The antenna 100 may be, for example, a cellular base station antenna at a macrocell base station or at a small-cell base station. In some embodiments, the antenna 100 may include a radome and a top end cap and/or a bottom end cap. For simplicity of illustration, the radome, the top end cap, and the bottom end cap are omitted from view in FIGS. 1A and 1B. The bottom end cap may include a plurality of RF connectors 145 (FIG. 1D) mounted therein. The connectors 145, which may also be referred to herein as "ports," are not limited, however, to being located on the bottom end cap. The antenna 100 is typically mounted in a vertical configuration (i.e., the long side of the antenna 100 extends along a vertical axis with respect to Earth).

The antenna 100 includes a reflector assembly RL having a hexagonal cross-section, and six arrays 120-1 through 120-6 of radiating elements RE mounted on six faces F-1 through F-6, respectively, of the reflector assembly RL. The first, third, and fifth faces F-1, F-3, and F-5 (which may collectively be referred to herein as a group of "first faces") are non-consecutive faces F that alternate along the reflector assembly RL with the non-consecutive second, fourth, and sixth faces F-2, F-4, and F-6 (which may collectively be referred to herein as a group of "second faces"). The radiating elements RE are mounted to extend outwardly from the faces F and such that each array 120 is oriented generally vertically with respect to the horizon when the antenna 100 is mounted for use. Each face F may act as a reflector and as a ground plane for the radiating elements RE mounted thereon.

A plurality of parasitic elements 130 are on the faces F between the arrays 120. As an example, each radiating element RE (e.g., crossed-dipole radiators thereof) may be horizontally between a pair of parasitic elements 130. In some embodiments, the pair of parasitic elements 130 may be on the same face F as the radiating element RE. Accordingly, each face F may have two vertical columns of parasitic elements 130 thereon (e.g., on/adjacent respective outer edge/perimeter portions of the face F), and a vertical column of radiating elements RE between the two vertical columns of parasitic elements 130, as shown in FIGS. 1A and 1B.

The first through sixth arrays 120-1 through 120-6 are consecutive arrays on the first through sixth faces F-1 through F-6. As a result, (i) the first and second arrays 120-1, 120-2 have two vertical columns of parasitic elements 130 (one on the first face F-1 and another on the second face F-2) therebetween, (ii) the second and third arrays 120-2, 120-3 have two vertical columns of parasitic elements 130 therebetween, (iii) the third and fourth arrays 120-3, 120-4 have two vertical columns of parasitic elements 130 therebetween, (iv) the fourth and fifth arrays 120-4, 120-5 have two vertical columns of parasitic elements 130 therebetween, (v) the fifth and sixth arrays 120-5, 120-6 have two vertical columns of parasitic elements 130 therebetween, and (vi) the sixth and first arrays 120-6, 120-1 have two vertical columns of parasitic elements 130 therebetween.

In some embodiments, antenna beams may be generated by two different groups of non-consecutive arrays 120. For example, a first group comprising the non-consecutive first, third, and fifth arrays 120-1, 120-3, 120-5 may be excited simultaneously by an RF signal to collectively generate first and third antenna beams (e.g., an antenna beam at each polarization), and a second group comprising the non-consecutive second, fourth, and sixth arrays 120-2, 120-4, 120-6 may be excited simultaneously to collectively generate second and fourth antenna beams (e.g., an antenna beam at each polarization). As an example, the first and second antenna beams may be first-polarization antenna beams, and the third and fourth antenna beams may be second-polarization antenna beams, where the first and second polarizations are different polarizations (e.g., orthogonal polarizations, such as +45° and −45° polarizations).

The radiating elements RE may have various shapes and/or structures. For example, the radiating elements RE may be sheet-metal or PCB-based radiating elements that may be implemented with various shapes and/or feeding techniques. In some embodiments, the radiating elements RE may be patch radiating elements or crossed-dipole radiating elements.

Though the reflector assembly RL is shown in FIGS. 1A and 1B as having six faces F-1 through F-6, the reflector assembly RL may, in other embodiments, have fewer faces F, such as a total of three, four, or five faces F that have respective arrays 120 mounted thereon. Accordingly, the antenna 100 may be implemented as a tri-sector, four-sector, or five-sector antenna rather than the six-sector antenna that is shown in FIGS. 1A and 1B. The reflector assembly RL may thus have a non-hexagonal cross-section, such as a triangular cross-section or a rectangular cross-section. To facilitate the antenna 100 generating an omnidirectional antenna pattern in the azimuth plane, the reflector assembly RL may have at least three faces F, and may have more than six faces F in some embodiments.

Figure 1C:
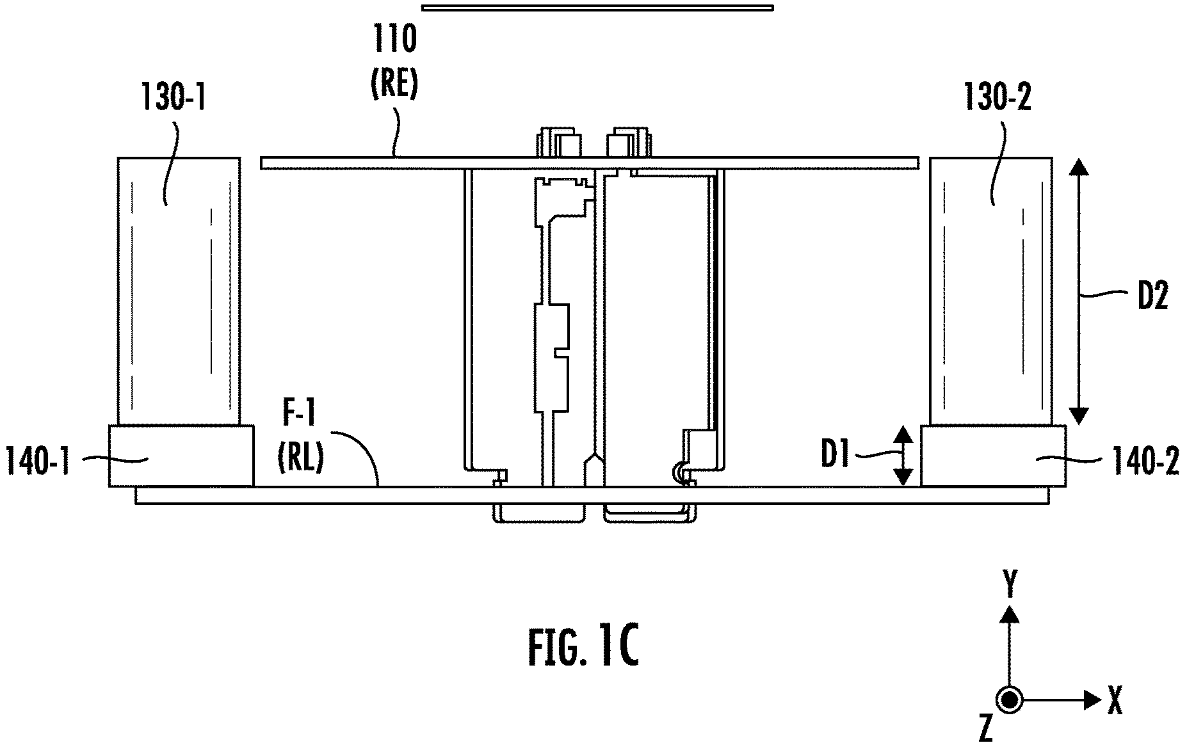
FIG. 1C is an enlarged view of a portion of FIG. 1B.

FIG. 1C is an enlarged view of a portion of FIG. 1B. As shown in FIG. 1C, a radiating element RE mounted on the first face F-1 of the reflector assembly RL is between, in a horizontal direction X, a first parasitic element 130-1 and a second parasitic element 130-2 that are on/adjacent respective edge/perimeter portions of the first face F-1.

The radiating element RE may extend outward/forward from the first face F-1 in a horizontal direction Y that is perpendicular to the direction X. The directions X, Y may each be perpendicular to a vertical direction Z. The first and second parasitic elements 130-1, 130-2 may extend longitudinally (e.g., project outward/forward from the first face F-1) in the direction Y. The first and second parasitic elements 130-1, 130-2 may thus extend away from the first face F-1 in parallel with the radiating element RE, and therefore may be perpendicular to the first face F-1.

According to some embodiments, the radiating element RE may not overlap the first and second parasitic elements 130-1, 130-2 in the direction Y, as the first and second parasitic elements 130-1, 130-2 may be spaced apart in the direction X from outermost ends/edges of the radiating element RE, as shown in FIG. 1C. FIG. 1C thus shows an example in which the first and second parasitic elements 130-1, 130-2 are not between, in the direction Y, the radiating element RE and the reflector assembly RL.

In some embodiments, respective distal surfaces/ends of the first and second parasitic elements 130-1, 130-2 that are farthest from the first face F-1 may be adjacent (e.g., coplanar with) a PCB 110 of the radiating element RE that is parallel with the first face F-1. Dipole arms of the radiating element RE may be formed on the PCB 110. The first and second parasitic elements 130-1, 130-2, which typically do not extend outward/forward in the direction Y beyond the PCB 110, may each have a length D2 in the direction Y. The length D2 may be, for example, 18-20 millimeters ("mm"), such as 18-19 mm, which may be about a quarter-wavelength of a high-frequency portion (e.g., 4.1 GHz) of an operating frequency band of the radiating elements RE. According to some embodiments, the length D2 may be 18-20 mm when the radiating elements RE operate in the 1,695-2,690 megahertz ("MHz") frequency band. When the length D2 is longer than about 20 mm, however, it may result in decreased performance of the antenna 100. Moreover, the first and second parasitic elements 130-1, 130-2 may each be spaced apart from the first face F-1 by a distance D1 of 2-5 mm in the direction Y. As an example, the distance D1 may be 4 mm and the length D2 may be 18 mm. Accordingly, the respective distal surfaces/ends of the first and second parasitic elements 130-1, 130-2 may be about 22 mm from the first face F-1.

According to some embodiments, first and second insulating (e.g., plastic) supports 140-1, 140-2 may be between the first and second parasitic elements 130-1, 130-2, respectively, and the first face F-1. The insulating supports 140 separate the parasitic elements 130 from the reflector assembly RL. Each insulating support 140 may have a thickness in the direction Y that is equal to the distance D1. Depending on the thickness of the insulating supports 140, the parasitic elements 130 may be either (a) capacitively coupled to the reflector assembly RL (if the insulating supports 140 are relatively thin) or (b) electrically floating (if the insulating supports 140 are relatively thick).

In other embodiments, the insulating supports 140 may be omitted and the distance D1 may be zero. The parasitic elements 130 may thus be electrically shorted to the reflector assembly RL.

For simplicity of illustration, FIG. 1C shows the distance D1 and the length D2 with respect to only the first face F-1 of the reflector assembly RL. According to some embodiments, however, each parasitic element 130 on each of the six faces F-1 through F-6 (FIG. 1B) of the reflector assembly RL may project outward/forward (e.g., horizontally) from the reflector assembly RL, may have the length D2, and/or may be separated from the reflector assembly RL by the distance D1.

Figure 1D:
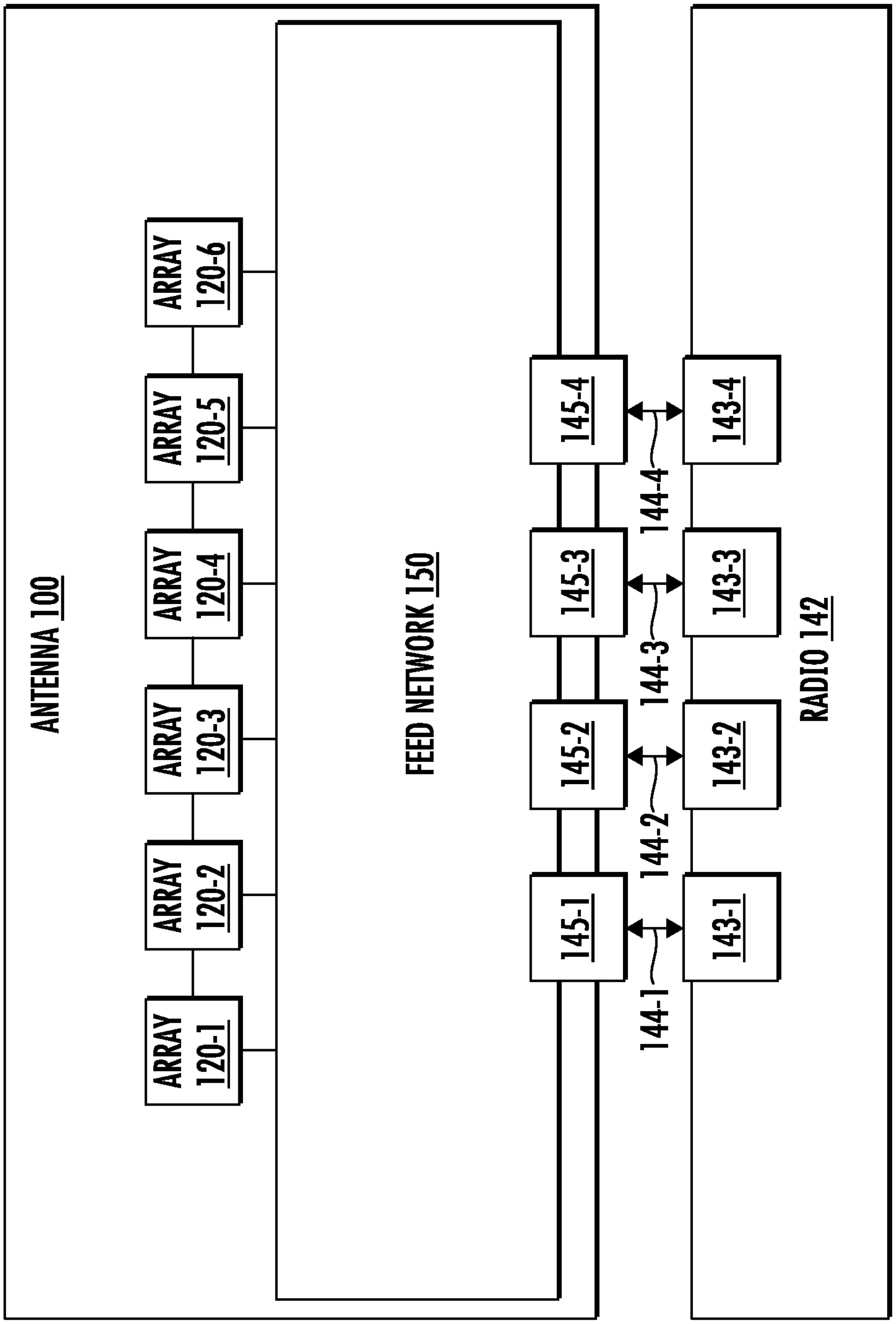
FIG. 1D is a schematic block diagram of ports of the base station antenna of FIG. 1A electrically connected to ports of a radio.

FIG. 1D is a schematic block diagram of the base station antenna 100 showing its connections to respective ports 143 of a radio 142. For example, the radio 142 may be a cellular base station radio, such as a remote radio head, and the antenna 100 and the radio 142 may be located at (e.g., may be components of) a cellular base station. In some embodiments, the radio 142 may be mounted below the antenna 100. As shown in FIG. 1D, ports 145-1 through 145-4 of the antenna 100 are electrically connected to ports 143-1 through 143-4, respectively, of the radio 142 by respective RF transmission lines 144-1 through 144-4, such as coaxial cables. The ports 145-1 through 145-4 of the antenna 100 are electrically coupled to six arrays 120-1 through 120-6 of radiating elements RE (FIG. 1B) through an RF feed network 150.

In some embodiments, the radio 142 may be a four-port radio. The RF feed network 150 is coupled between the six arrays 120-1 through 120-6 and the radio 142. For example, the arrays 120 may be coupled to respective RF transmission paths (e.g., including one or more RF transmission lines) of the feed network 150.

According to some embodiments, the radiating elements RE are dual-polarized and each array 120 is coupled to a single port 145 per polarization. For example, the non-consecutive arrays 120-1, 120-3, and 120-5 may each be coupled to the first-polarization port 145-1 and the second-polarization port 145-2. The non-consecutive arrays 120-2, 120-4, and 120-6 may each be coupled to the first-polarization port 145-3 and the second-polarization port 145-4. Accordingly, each array 120 is coupled to two of the ports 145-1 through 145-4.

In some embodiments, the radio ports 143-1 and 143-3 may be first-polarization ports (and the radio ports 143-2 and 143-4 may be second-polarization ports). Moreover, the radio 142 may be a multi-input-multi-output ("MIMO") radio, and the antenna 100 may comprise a 4-Transmit/4-Receive ("4T4R") antenna array (which is coupled to four radio ports 143 through four antenna ports 145). For example, the three non-consecutive arrays 120-1, 120-3, and 120-5 may collectively provide a first 2T2R array that is coupled to the first and second radio ports 143-1, 143-2, and the three non-consecutive arrays 120-2, 120-4, and 120-6 may collectively provide a second 2T2R array that is coupled to the third and fourth radio ports 143-3, 143-4.

Radiating elements RE of the six arrays 120-1 through 120-6 may transmit and/or receive RF signals in one or more frequency bands, such as one or more bands comprising frequencies between 2.3 gigahertz ("GHz") and 4.1 GHz. For example, the radiating elements RE may be wideband radiating elements that are configured to cover the entire 2.3-4.1 GHz range.

Parasitic elements 130 (FIG. 1), unlike the radiating elements RE, are not driven elements that are electrically connected to the radio 142 through the RF feed network 150. Rather, the parasitic elements 130 can receive and re-radiate radio waves from the driven radiating elements RE (e.g., can re-radiate radio waves in a different phase).

The arrays 120 may each include a plurality of radiating elements RE that are spaced apart from each other in the vertical direction Z (FIG. 1B) so that each array 120 extends in the vertical direction Z. For example, each array 120 may extend from a lower portion of an antenna assembly of antenna 100 to an upper portion of the antenna assembly. The vertical direction may be, or may be parallel with, a longitudinal axis that is perpendicular to the horizon. As used herein, the term "vertical" does not necessarily require that something is exactly vertical (e.g., the antenna 100 may have a small mechanical down-tilt). The number of radiating elements RE in an array 120 can be any quantity from two to twenty or more. In some embodiments, the arrays 120 may each have the same number (e.g., eight) of radiating elements RE.

Moreover, the antenna 100 may include phase shifters that are used to electronically adjust the tilt angles of radiation patterns generated by the arrays 120. The phase shifters may be located at any appropriate location along the RF transmission paths that extend between the ports 145 and the arrays 120. Accordingly, though omitted from view in FIG. 1D for simplicity of illustration, the feed network 150 may include phase shifters.

FIGS. 2A-2D are schematic front views of different arrangements of parasitic elements 130 on the first face F-1 of the reflector assembly RL of FIG. 1A. For simplicity of illustration, only three radiating elements RE are shown in the first array 120-1 that is on the first face F-1 in FIGS. 2A-2D. In some embodiments, however, four or more radiating elements RE may be on each face F. In other embodiments, only one or only two radiating elements RE may be on each face F.

Figure 2B:
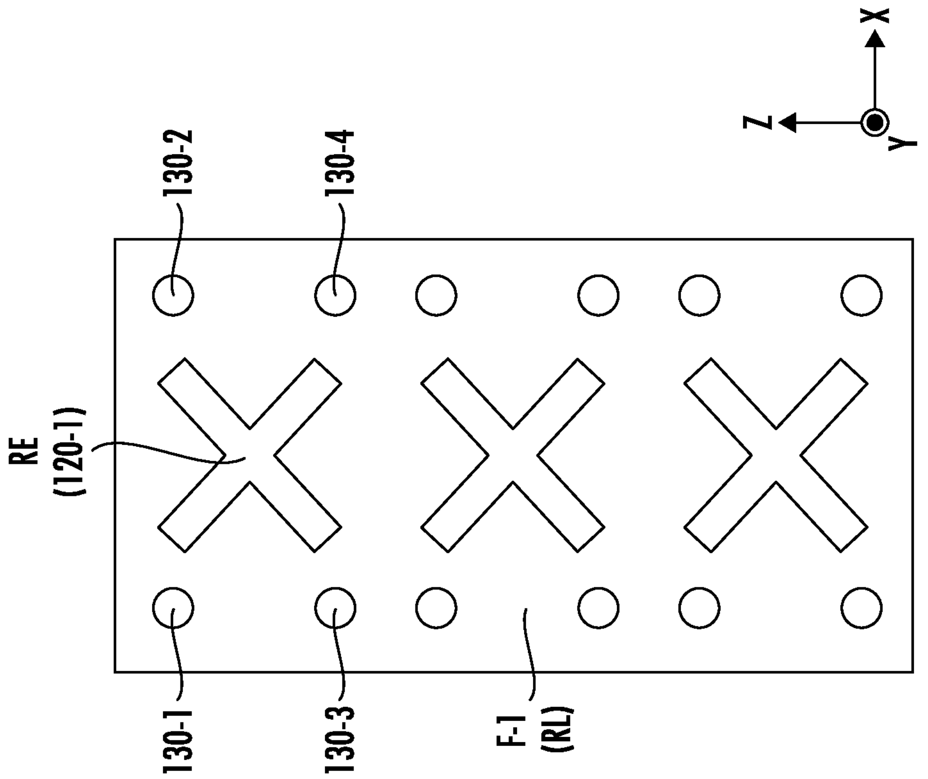
FIGS. 2A-2D are schematic front views of different arrangements of parasitic elements on a face of the reflector of FIG. 1A.
Figure 2A:
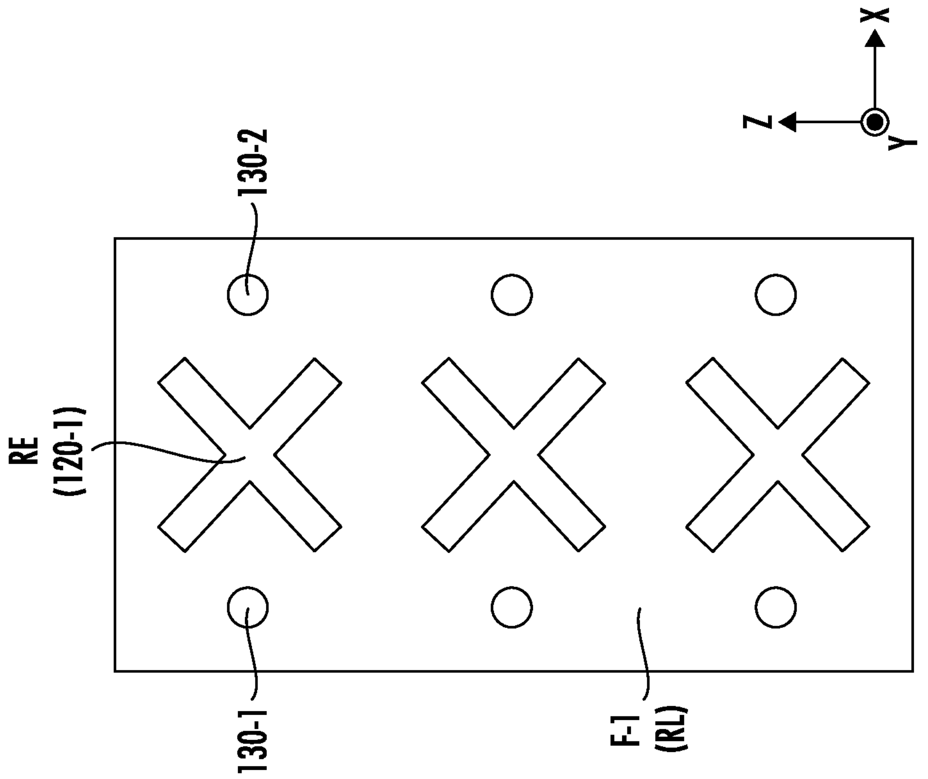

As shown in FIG. 2A, each radiating element RE in the first array 120-1 is between, in the direction X, a pair of parasitic elements 130. Accordingly, the total number of parasitic elements on the first face F-1 is double the total number of radiating elements RE on the first face F-1. In some embodiments, a first vertical column of parasitic elements 130 may be aligned with each other (i.e., collinear) in the direction Z, and a second vertical column of parasitic elements 130 may be aligned with each other in the direction Z and spaced apart from the first vertical column in the direction X. Moreover, FIG. 2A shows that each pair of parasitic elements 130 may be aligned, in the direction X, with a center point of a respective radiating element RE.

As shown in FIG. 2B, each radiating element RE in the first array 120-1 is between, in the direction X, a quartet of (i.e., four) parasitic elements 130. Accordingly, the total number of parasitic elements on the first face F-1 is quadruple the total number of radiating elements RE on the first face F-1. According to some embodiments, a first vertical column of parasitic elements 130 may be aligned with each other in the direction Z, and a second vertical column of parasitic elements 130 may be aligned with each other in the direction Z and spaced apart from the first vertical column in the direction X. Two parasitic elements 130 of each quartet are in the first vertical column, and another two parasitic elements 130 of each quartet are in the second vertical column. Moreover, each quartet of parasitic elements 130 may, according to some embodiments, be near end points of a respective adjacent radiating element RE. For example, FIG. 2B shows four parasitic elements 130-1 through 130-4 that are adjacent four end points, respectively, of a radiating element RE (e.g., end points of radiators thereof).

Figure 2D:
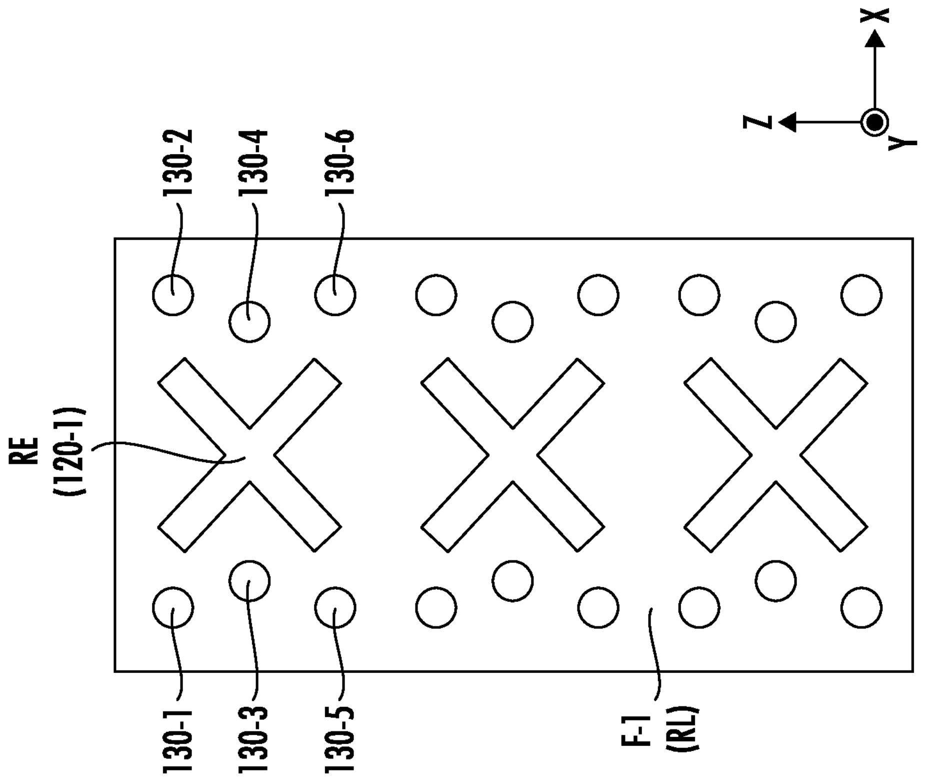
Figure 2C:
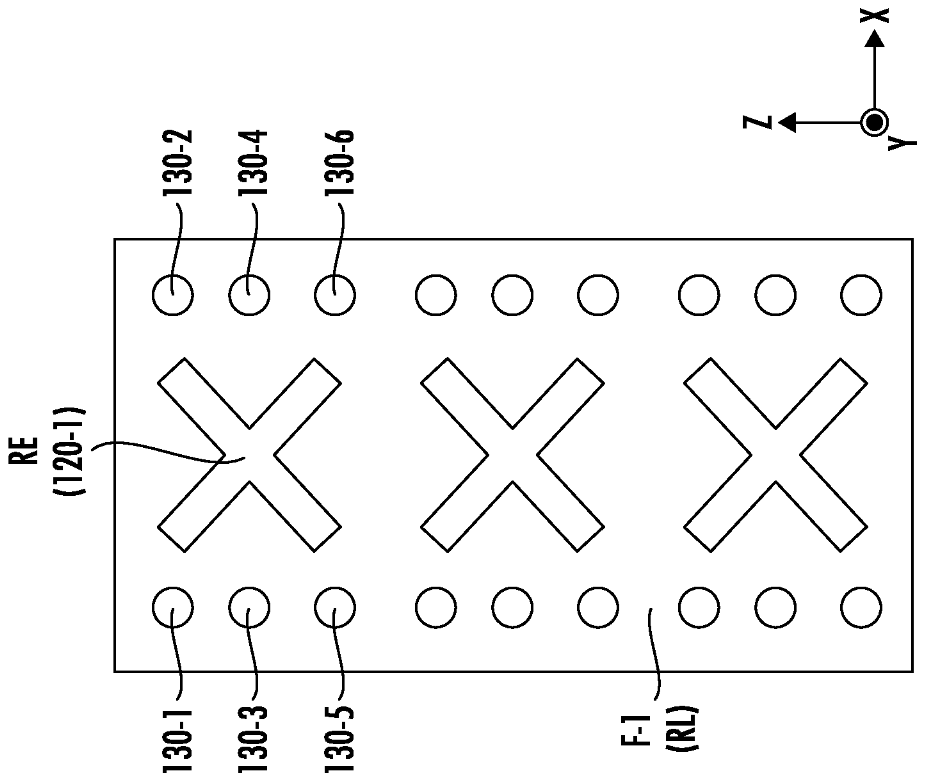

As shown in FIG. 2C, each radiating element RE in the first array 120-1 is between, in the direction X, a sextet of (i.e., six) parasitic elements 130. Accordingly, the total number of parasitic elements on the first face F-1 is sextuple the total number of radiating elements RE on the first face F-1. According to some embodiments, a first vertical column of parasitic elements 130 may be aligned with each other in the direction Z, and a second vertical column of parasitic elements 130 may be aligned with each other in the direction Z and spaced apart from the first vertical column in the direction X. Three parasitic elements 130 of each sextet are in the first vertical column, and another three parasitic elements 130 of each sextet are in the second vertical column. Moreover, each sextet of parasitic elements 130 may, according to some embodiments, include four parasitic elements 130 that are near end points of a respective adjacent radiating element RE and two parasitic elements 130 that are aligned in the direction X with a center point of the respective adjacent radiating element RE. For example, FIG. 2C shows four parasitic elements 130-1, 130-2, 130-5, and 130-6 that are adjacent four end points, respectively, of an adjacent radiating element RE, and two parasitic elements 130-3, 130-4 that are collinear in the direction X with a center point of the adjacent radiating element RE.

As shown in FIG. 2D, the locations of the parasitic elements 130-3, 130-4 that are collinear with the center point of the radiating element RE may be shifted inward, in the direction X, relative to the parasitic elements 130-3, 130-4 of FIG. 2C. Accordingly, three parasitic elements 130-1, 130-3, and 130-5 that are adjacent a first (e.g., left) side of the radiating element RE may be staggered with each other (e.g., may not all be collinear in the direction Z). Likewise, three parasitic elements 130-2, 130-4, and 130-6 that are adjacent a second (e.g., right) side of the adjacent radiating element RE may be staggered with each other (e.g., may not all be collinear in the direction Z). For example, the parasitic elements 130-3, 130-4 may each be shifted closer, in the direction X, to the center point of the radiating element RE, while the remaining four parasitic elements 130-1, 130-2, 130-5, and 130-6 may have the same locations as in FIG. 2C. Moreover, the parasitic element 130-3 may be aligned in the direction Z with other parasitic elements 130 in a third vertical column, and the parasitic element 130-4 may be aligned in the direction Z with other parasitic elements 130 in a fourth vertical column.

Accordingly, FIGS. 2A-2D show that the total number of parasitic elements 130 on the first face F-1 may be at least double or at least quadruple (e.g., sextuple) the total number of radiating elements RE on the first face F-1, and that the parasitic elements 130 may be in two or more (e.g., four) vertical columns on the first face F-1. For simplicity of illustration, only the first face F-1 is shown in FIGS. 2A-2D. In some embodiments, however, the remaining five faces F-2 through F-6 may have analogous arrangements of parasitic elements 130 thereon.

Figure 3C:
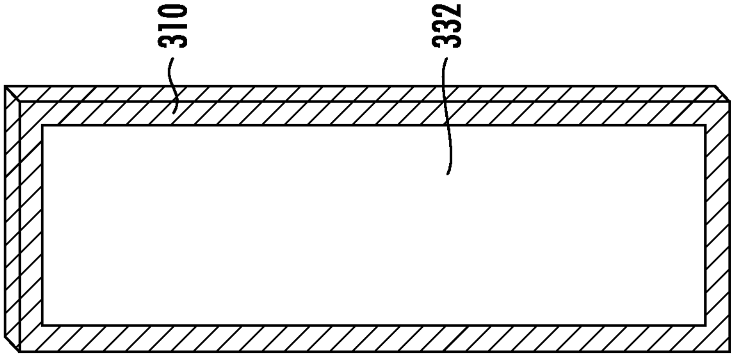
FIGS. 3A-3C are side perspective views of different types of parasitic elements that can be implemented with the base station antenna of FIG. 1A.
Figure 3B:
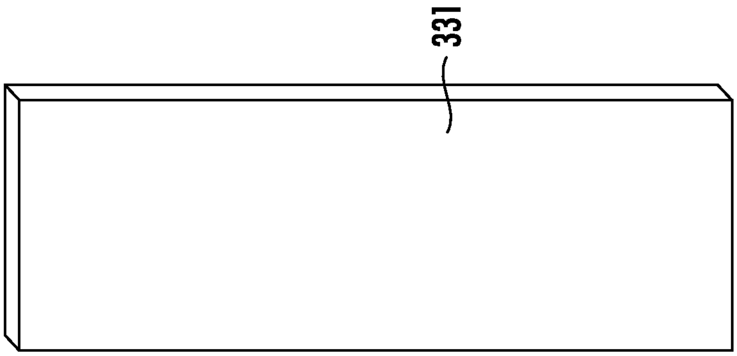
Figure 3A:
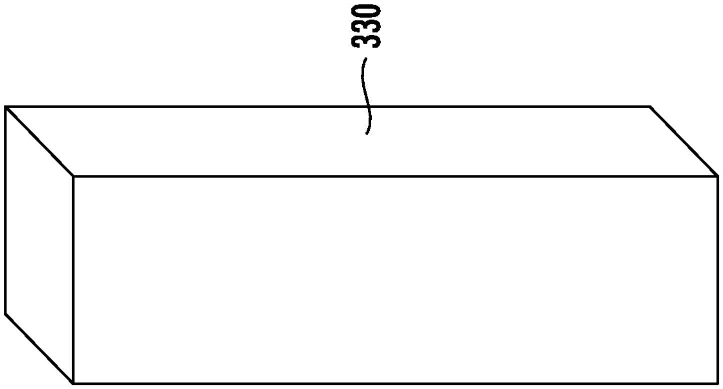

FIGS. 3A-3C are side perspective views of different types of parasitic elements that can be implemented with the base station antenna 100 of FIG. 1A. In some embodiments, parasitic elements 130 of the antenna 100 may be implemented as respective metal rods. For example, the metal rods may be cylindrical metal rods 130, as shown in FIGS. 1A-1C and 2A-2D.

In other embodiments, the metal rods may be rectangular (e.g., rectangular cuboid) metal rods 330, as shown in FIG. 3A. The rectangular metal rods 330 may be used in the place of any of the cylindrical metal rods 130 that are shown in FIGS. 1A-1C and 2A-2D. Like the cylindrical metal rods 130, the rectangular metal rods 330 may project outward/forward from (e.g., be perpendicular to) faces F of the reflector assembly RL of FIG. 1B. Moreover, L-shaped parasitic elements may be used in the place of any of the cylindrical metal rods 130 that are shown in FIGS. 1A-1C and 2A-2D, according to some embodiments. L-shaped rods may be conveniently mounted on the faces F of the reflector assembly RL.

In further embodiments, parasitic elements may be implemented as respective metal sheets 331, as shown in FIG. 3B. The metal sheets 331 may be used in the place of any of the cylindrical metal rods 130 that are shown in FIGS. 1A-1C and 2A-2D. In some embodiments, each metal sheet 331 may project outward/forward from a face F (FIG. 1A) of the antenna 100 in parallel with an adjacent radiating element RE (FIG. 1A). For example, each metal sheet 331 (e.g., a primary surface thereof) may be perpendicular to the face F that it is on.

According to other embodiments, parasitic elements may be implemented as respective metal layers 332 that are on respective PCBs 310, as shown in FIG. 3C. The metal layers 332 and PCBs 310 may be used in the place of any of the cylindrical metal rods 130 that are shown in FIGS. 1A-1C and 2A-2D, and may be spaced apart from any radiating elements RE. In some embodiments, each metal layer 332 (and its respective PCB 310) may project outward/forward from a face F of the antenna 100 in parallel with an adjacent radiating element RE. For example, each metal layer 332 (and its respective PCB 310) may be perpendicular to the face F that it is on.

Figure 4A:
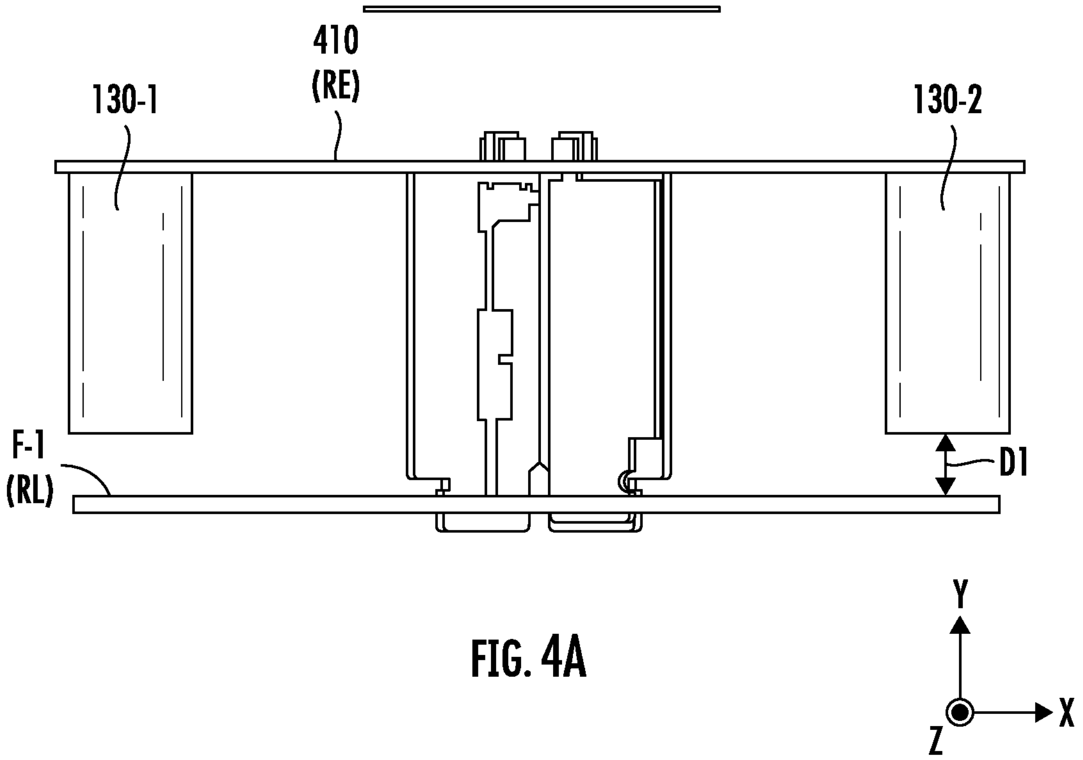
FIG. 4A is a top view of a radiating element having parasitic elements on a printed circuit board ("PCB") thereof, according to embodiments of the present invention.

FIG. 4A is a top view of a radiating element RE having parasitic elements 130 on a PCB 410 of the radiating element RE, according to embodiments of the present invention. As shown in FIG. 4A, first and second parasitic elements 130-1, 130-2 may be suspended from a rear surface of the PCB 410 that faces the first face F-1 of the reflector assembly RL. The first and second parasitic elements 130-1, 130-2 may be spaced apart from each other in the direction X, and may be spaced apart from the first face F-1 by the distance D1 in the direction Y. For example, the first and second parasitic elements 130-1, 130-2 may contact the PCB 410 (e.g., a dielectric board thereof) and may be separated from the first face F-1 by air (rather than by insulating supports 140 (FIG. 1C)). According to some embodiments, the parasitic elements 130 may not extend beyond the PCB 410 in the direction Y away from the reflector assembly RF, and may not extend outward in the direction X beyond outermost points of the PCB 410. The parasitic elements 130, however, may be spaced apart from (e.g., outward, in the direction X, from) crossed-dipole radiators of the radiating element RE that are on the PCB 410.

For simplicity of illustration, only one radiating element RE on the first face F-1 is shown in FIG. 4A. In some embodiments, however, each of a plurality of radiating elements RE on the first face F-1 may have parasitic elements 130 on PCBs 410 thereof, and/or radiating elements RE on one or more of the second through sixth faces F-2 through F-6 may have parasitic elements 130 on PCBs 410 thereof.

Figure 4B:
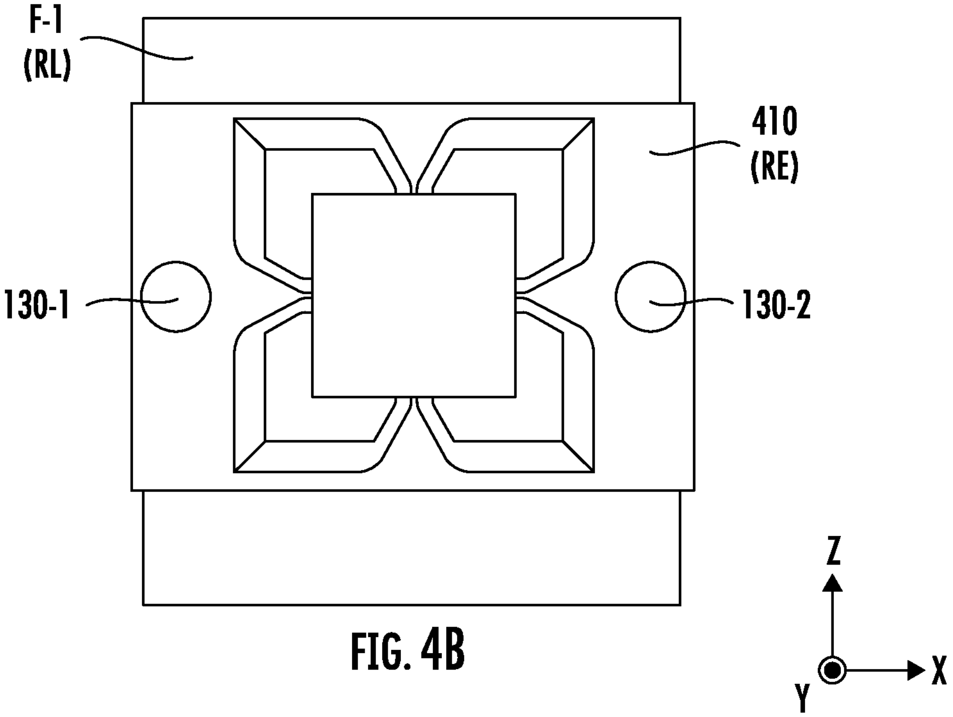
FIG. 4B is a front view of the radiating element of FIG. 4A.

FIG. 4B is a front view of the radiating element RE of FIG. 4A. As shown in FIG. 4B, the first and second parasitic elements 130-1, 130-2 may be collinear in the direction X with a center point of the radiating element RE, and may be on respective edge/perimeter portions of the PCB 410. For simplicity of illustrating locations of the first and second parasitic elements 130-1, 130-2 on the PCB 410, FIG. 4B depicts upper portions of the first and second parasitic elements 130-1, 130-2 (and/or fasteners therefor) as being visible on a front side of the PCB 410. In some embodiments, however, the first and second parasitic elements 130-1, 130-2 (and/or fasteners therefor) may not be visible on the front side of the PCB 410. For example, the PCB 410 may be opaque rather than translucent.

Figure 4C:
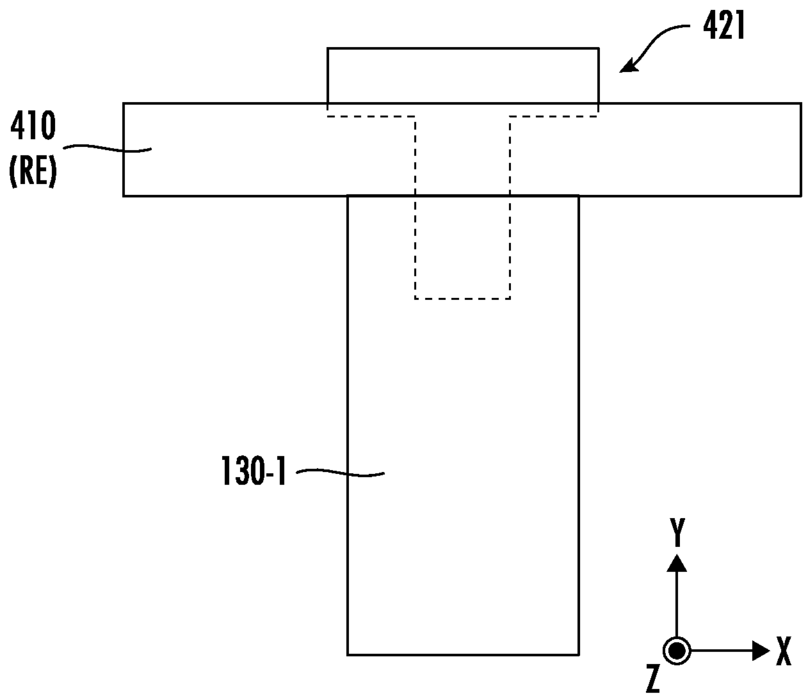
FIGS. 4C and 4D are schematic cross-sectional views of different examples of attaching a parasitic element to the radiating element of FIG. 4A.
Figure 4D:
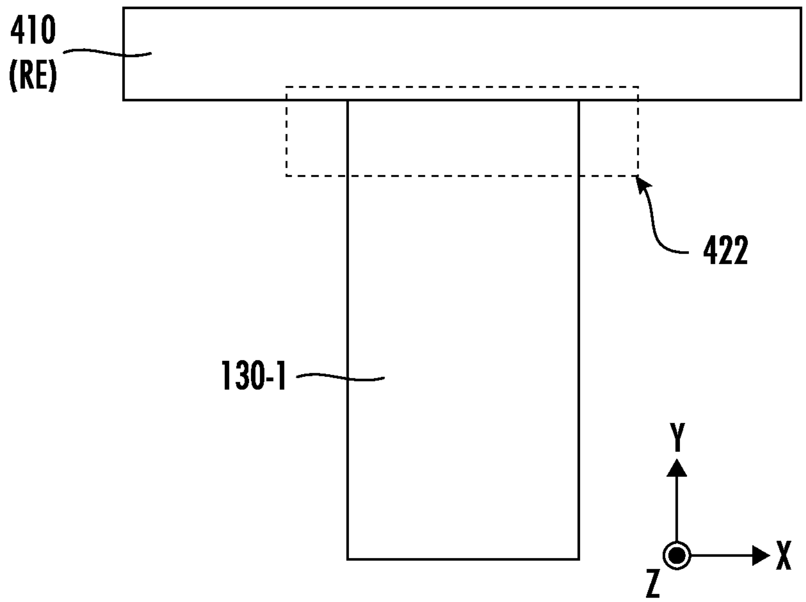

FIGS. 4C and 4D are schematic cross-sectional views of different examples of attaching the first parasitic element 130-1 to the radiating element RE of FIG. 4A. In some embodiments, a fastener 421 (e.g., a screw) may fasten an end of the first parasitic element 130-1 to the PCB 410, as shown in FIG. 4C. In other embodiments, the first parasitic element 130-1 may be soldered to the PCB 410. For example, the first parasitic element 130-1 may be attached to a rear surface of the PCB 410 by solder 422, as shown in FIG. 4D.

For simplicity of illustration, only the first parasitic element 130-1 is shown in FIGS. 4C and 4D. According to some embodiments, however, the second parasitic element 130-2 may be attached (i.e., fixed) to the PCB 410 by a fastener 421 or by solder 422.

Figure 4E:
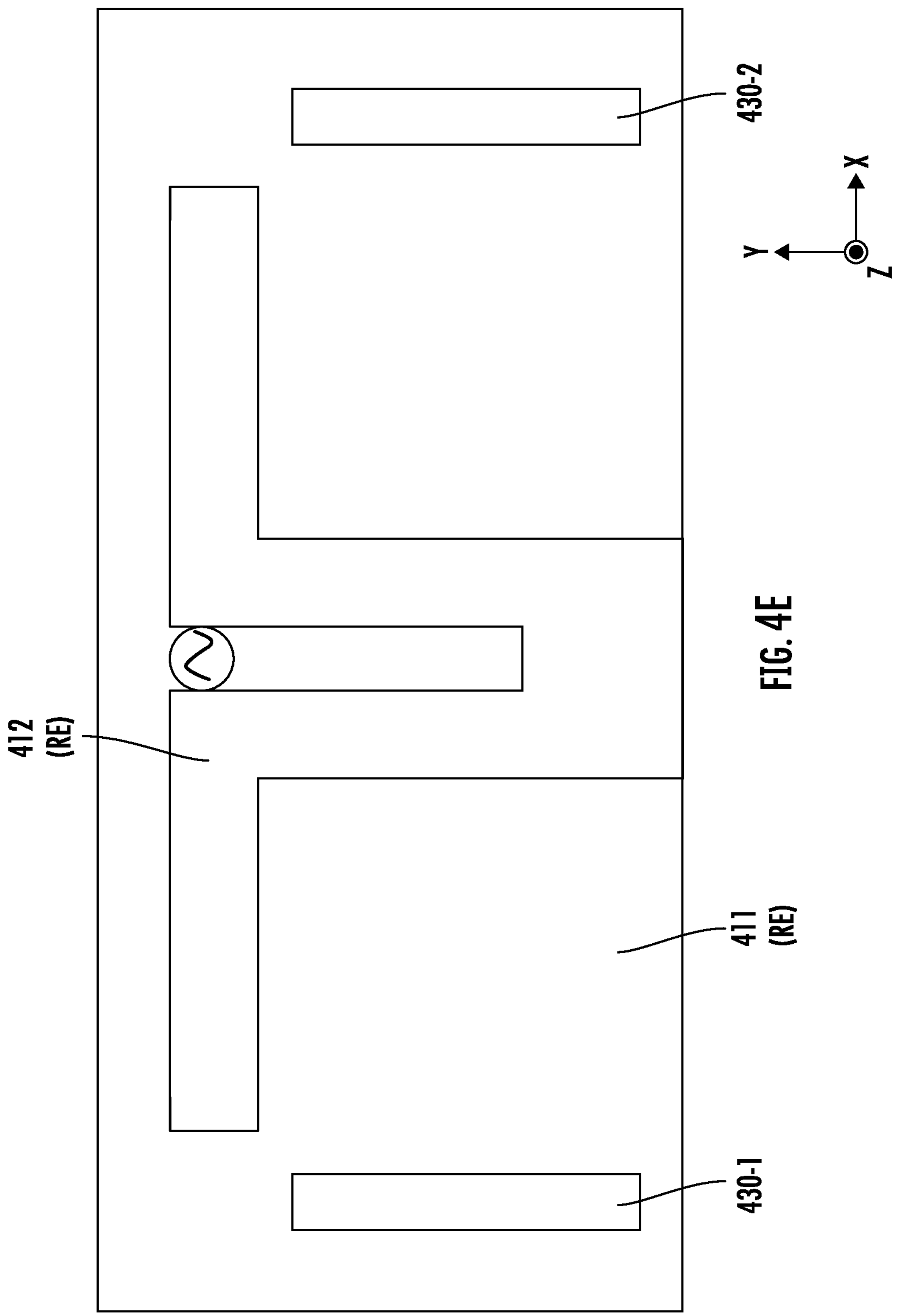
FIG. 4E is a top view of a radiating element having parasitic elements on a PCB thereof, according to other embodiments of the present invention.

FIG. 4E is a top view of a radiating element RE having first and second parasitic elements 430-1, 430-2 on a PCB 411 of the radiating element RE, according to other embodiments of the present invention. The radiating element RE may be implemented as a metal radiating element 412 on the PCB 411. Moreover, the first and second parasitic elements 430-1, 430-2 can be respective metal layers/regions on the PCB 411. Accordingly, the first and second parasitic elements 430-1, 430-2 may be integrated on the PCB 411 without being attached thereto via a fastener or solder.

Though one example of a radiating element 412 is shown in FIG. 4E, it will be understood that the radiating element 412 may have various shapes/structures on the PCB 411, and the shapes and locations of the first and second parasitic elements 430-1, 430-2 may depend on the shapes/structures of the radiating element 412. For example, though FIG. 4E shows that the first and second parasitic elements 430-1, 430-2 may be outward, in the direction X, of respective end points of the radiating element 412, the first and second parasitic elements 430-1, 430-2 may be inward, in the direction X, of the respective end points of the radiating element 412 in other embodiments. Moreover, though FIG. 4E shows that the PCB 411 is in/parallel to the X-Y plane (and thus is perpendicular to a face F of the reflector assembly RL (FIG. 1)), the PCB 411 may be parallel to the face F that the radiating element RE is on in further embodiments.

FIGS. 4A and 4E thus show different examples of a parasitic element that is on a PCB of a radiating element RE. In some embodiments, a parasitic element 130 may be suspended from (e.g., perpendicular to) a PCB 410 of a radiating element RE, as shown in FIG. 4A, such as by using a fastener 421 (FIG. 4C) or solder 422 (FIG. 4D). In other embodiments, a parasitic element 430 may be integrated with (e.g., may be a metal layer/region that is on and parallel with a dielectric board of) a PCB 411 without using a faster or solder, as shown in FIG. 4E.

Figure 5:
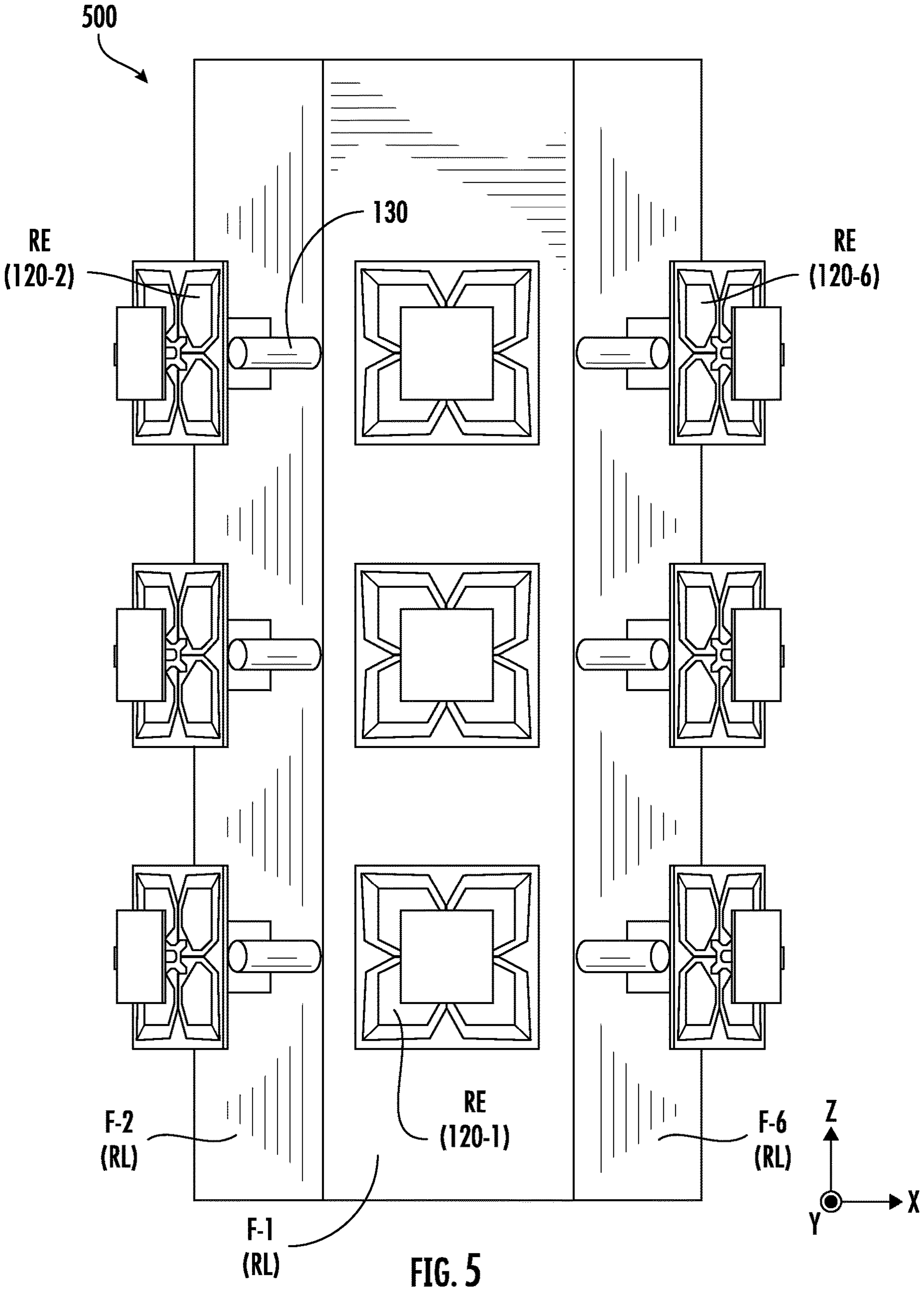
FIG. 5 is a side perspective view of a base station antenna that has a single vertical column of parasitic elements between adjacent arrays of radiating elements, according to further embodiments of the present invention.

FIG. 5 is a side perspective view of a base station antenna 500 that has a single vertical column of parasitic elements 130 between consecutive arrays 120 (e.g., the first and second arrays 120-1, 120-2) of radiating elements RE, according to further embodiments of the present invention. For example, the vertical column may be on or adjacent an interface/bend between consecutive faces F of the reflector assembly RL, and may be the only vertical column of parasitic elements 130 that is between the consecutive arrays 120. The antenna 500 may thus comprise fewer parasitic elements 130 than the antenna 100 of FIG. 1A, and therefore can provide greater spacing between the parasitic elements 130 and the radiating elements RE. As an example, the total number of parasitic elements 130 of the antenna 500 may be equal to the total number of radiating elements RE of the antenna 500. Accordingly, the total number of parasitic elements 130 of an antenna may be equal to or greater than the total number of radiating elements RE of the antenna, as shown by the different examples in FIGS. 2A-2D and 5.

Figure 6A:
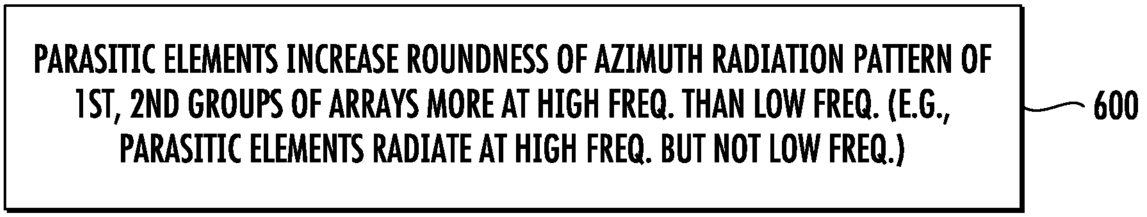
FIGS. 6A and 6B are flowcharts illustrating operations of the base station antenna of FIG. 1A.
Figure 6B:
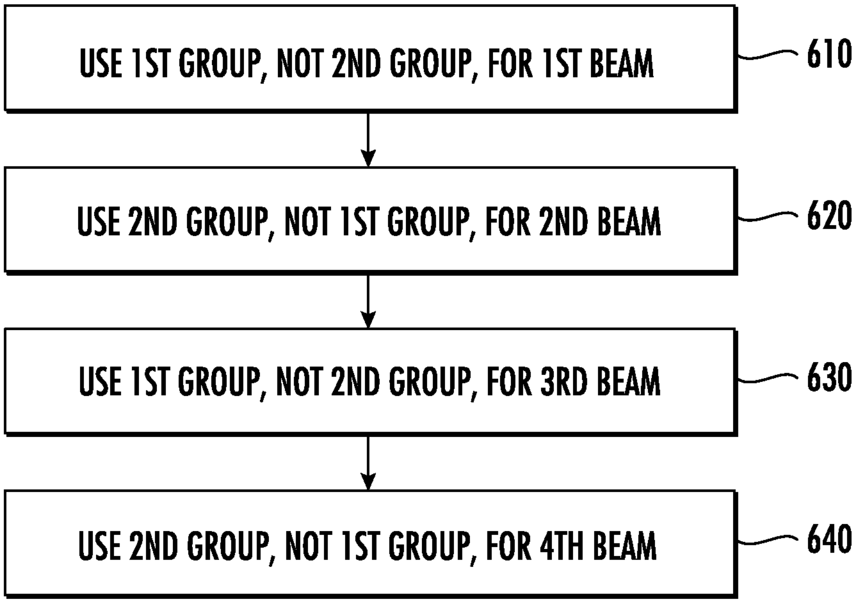

FIGS. 6A and 6B are flowcharts illustrating operations of the base station antenna 100 of FIG. 1A (or the base station antenna 500 of FIG. 5). As shown in FIG. 6A, the operations may include increasing (Block 600) the roundness of an azimuth radiation pattern of radiating elements RE of the antenna 100 (or the antenna 500). For example, the roundness may increase more at one or more high-frequency points/portions (e.g., the higher end, such as 4.1 GHz) of a frequency band of the radiating elements RE than at one or more low-frequency points/portions (e.g., the lower end, such as 2.3 GHz) of the frequency band.

In some embodiments, the increased roundness may result from the presence of the parasitic elements 130 that are between arrays 120 of radiating elements RE. For example, the parasitic elements 130 may radiate at the high-frequency point(s)/portion(s) and may not radiate at the low-frequency point(s)/portion(s). As an example, a length D2 (FIG. 1C) of the parasitic elements 130 may not be a resonant length at the low-frequency point(s)/portion(s).

According to some embodiments, the roundness may increase for an azimuth radiation pattern that is generated collectively by first and second groups of arrays 120 of radiating elements RE. For example, the first group may include the non-consecutive first, third, and fifth arrays 120-1, 120-3, and 120-5, and the second group may include the non-consecutive second, fourth, and sixth arrays 120-2, 120-4, and 120-6.

As shown in FIG. 6B, operations of increasing the roundness (Block 600 of FIG. 6A) may comprise providing (Block 610) a first antenna beam via the first group (which may also be referred to herein as the “first arrays”) and not via the second group (which may also be referred to herein as the “second arrays”). The operations may include providing (Block 620) a second antenna beam via the second group and not via the first group. Moreover, the operations may include providing (Block 630) a third antenna beam via the first group and not via the second group, and providing (Block 640) a fourth antenna beam via the second group and not via the first group. In some embodiments, the first and second antenna beams are first-polarization antenna beams and the third and fourth antenna beams are second-polarization antenna beams.

For simplicity of illustration, Blocks 610-640 are illustrated sequentially in FIG. 6B. According to some embodiments, however, operations of two or more of Blocks 610-640 may be performed concurrently. For example, an operation of Block 620 may be performed concurrently with an operation of Block 610 and/or concurrently with an operation of Block 630 and/or Block 640.

Base station antennas 100, 500 (FIGS. 1A and 5) according to embodiments of the present invention may provide a number of advantages. These advantages include broadening the beamwidths of antenna beams generated by arrays 120 of the antenna 100 (or the antenna 500) while only impacting high frequencies (and not low frequencies). Accordingly, the roundness of an azimuth radiation pattern of the arrays 120 may increase at high frequencies without being affected at low frequencies. For example, this may be achieved by including parasitic elements 130 that are on a reflector assembly RL of the antenna 100 (or the antenna 500) between consecutive arrays 120. In some embodiments, the antennas 100, 500 may be wideband omnidirectional antennas, and the reflector assembly RL may have at least three faces F (e.g., six faces F) that face different respective directions.

According to some embodiments, the parasitic elements 130 may be capacitively coupled to the reflector assembly RL and/or may be electrically floating. In other embodiments, the parasitic elements 130 may be electrically shorted to the reflector assembly RL and can provide acceptable performance. Moreover, azimuth roundness may increase at high frequencies when a parasitic element 130 is relatively far from any radiating elements RE and/or has a length D2 (FIG. 1C) that is about a quarter-wavelength of a high-frequency portion of an operating frequency band of the radiating elements RE.

The present invention has been described above with reference to the accompanying drawings. The present invention is not limited to the illustrated embodiments. Rather, these embodiments are intended to fully and completely disclose the present invention to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," "coupled," and the like can mean either direct or indirect attachment or coupling between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

What is claimed is:

1. A base station antenna comprising:
a reflector that has a plurality of faces that face in different directions;
a plurality of arrays of radiating elements that are on the faces, respectively, of the reflector; and
a plurality of parasitic elements that are on the faces between the arrays,
wherein the faces comprise at least three faces, and
wherein the parasitic elements are configured to radiate at a high-frequency portion of a frequency band of the radiating elements, and to not radiate at a low-frequency portion of the frequency band.

2. The base station antenna of claim 1, wherein a total number of the parasitic elements is equal to or greater than a total number of the radiating elements.

3. The base station antenna of claim 2, wherein the total number of the parasitic elements is at least double the total number of the radiating elements.

4. The base station antenna of claim 2, wherein the total number of the parasitic elements is at least quadruple the total number of the radiating elements.

5. The base station antenna of claim 1, wherein the parasitic elements comprise respective metal rods.

6. The base station antenna of claim 5, wherein longitudinal axes of the metal rods project outward from the faces.

7. The base station antenna of claim 5, wherein the metal rods are cylindrical.

8. The base station antenna of claim 5, wherein the metal rods are rectangular.

9. The base station antenna of claim 5, wherein each of the metal rods has a length of 18-20 millimeters.

10. The base station antenna of claim 1, wherein the parasitic elements comprise respective metal sheets.

11. The base station antenna of claim 1, wherein the parasitic elements comprise respective metal layers on respective printed circuit boards that are spaced apart from the radiating elements.

12. The base station antenna of claim 1, wherein a first of the parasitic elements is on a printed circuit board of a first of the radiating elements.

13. The base station antenna of claim 1, further comprising a plurality of insulating supports that are between the parasitic elements, respectively, and the reflector.

14. The base station antenna of claim 1, wherein the arrays comprise consecutive first through sixth arrays on consecutive first through sixth of the faces, respectively.

15. The base station antenna of claim 14,
wherein the first, third, and fifth arrays are configured to collectively generate first and third antenna beams, and
wherein the second, fourth, and sixth arrays are configured to collectively generate second and fourth antenna beams.

16. The base station antenna of claim 1, wherein the parasitic elements are configured to increase a roundness of an azimuth radiation pattern of the radiating elements more at a high-frequency portion of a frequency band of the radiating elements than at a low-frequency portion of the frequency band.

17. The base station antenna of claim 1, wherein at least two of the parasitic elements are between a first of the radiating elements that is on a first of the faces and a second of the radiating elements that is on a second of the faces, wherein the first of the faces is adjacent the second of the faces, and wherein no radiating element is between the first and the second of the radiating elements.

18. The base station antenna of claim 1, wherein at least a first of the radiating elements is on a first surface of a printed circuit board (PCB), and wherein first and second parasitic elements of the plurality of parasitic elements are on a second surface of the PCB opposite the first surface of the PCB and facing the reflector, the first and second parasitic elements being spaced apart from one another and spaced apart from the reflector.

19. A base station antenna comprising:

a reflector that has a plurality of faces that face in different directions;

a plurality of arrays of radiating elements that are on the faces, respectively, of the reflector; and a plurality of parasitic elements that are on the faces, wherein the parasitic elements are configured to increase a roundness of an azimuth radiation pattern of the radiating elements more at a high-frequency portion of a frequency band of the radiating elements than at a low-frequency portion of the frequency band.

20. A method of operating an omnidirectional base station antenna, the method comprising:

providing a first antenna beam via a plurality of first arrays of radiating elements that are on a plurality of non-consecutive first faces, respectively, of a reflector of the omnidirectional base station antenna; and providing a second antenna beam via a plurality of second arrays of radiating elements that are on a plurality of non-consecutive second faces, respectively, of the reflector, wherein the omnidirectional base station antenna comprises a plurality of parasitic elements that are on the reflector between the first arrays and the second arrays, and wherein the parasitic elements increase a roundness of an azimuth radiation pattern of the first arrays and the second arrays more at a high-frequency portion of a frequency band of the first arrays and the second arrays than at a low-frequency portion of the frequency band.

* * * * *